(12) United States Patent
Porter

(10) Patent No.: US 11,714,191 B2
(45) Date of Patent: Aug. 1, 2023

(54) SYSTEM AND METHOD FOR WEATHER CLUTTER REJECTION USING POLARIMETRY DATA FOR TERRAIN FOLLOWING RADAR

(71) Applicant: Raytheon Company, Waltham, MA (US)

(72) Inventor: Stephen R. Porter, Fairview, TX (US)

(73) Assignee: Raytheon Company, Waltham, MA (US)

(*) Notice: Subject to any disclaimer, the term of this patent is extended or adjusted under 35 U.S.C. 154(b) by 354 days.

(21) Appl. No.: 16/984,761

(22) Filed: Aug. 4, 2020

(65) Prior Publication Data

US 2022/0043141 A1 Feb. 10, 2022

(51) Int. Cl.
*G01W 1/10* (2006.01)
*G01W 1/02* (2006.01)
(Continued)

(52) U.S. Cl.
CPC ............ *G01S 13/953* (2013.01); *G01W 1/10* (2013.01); *G05D 1/102* (2013.01); *G05D 1/1062* (2019.05);
(Continued)

(58) Field of Classification Search
CPC ...... G01S 13/953; G01S 13/935; G01S 7/025; G01S 7/411; G01W 1/10; G01W 1/02; G05D 1/102; G05D 1/1062
See application file for complete search history.

(56) References Cited

U.S. PATENT DOCUMENTS

| 6,591,171 B1 * | 7/2003 | Ammar | F41G 7/2246 |
| | | | 701/16 |
| 8,601,864 B1 | 12/2013 | Eilts et al. | |
| 8,984,939 B1 | 3/2015 | Eilts et al. | |

(Continued)

FOREIGN PATENT DOCUMENTS

| EP | 0898718 B1 * | 2/2002 | ........... F41G 7/2226 |
| KR | 20110075532 A * | 7/2011 | ......... G01S 13/9021 |

OTHER PUBLICATIONS

Döring (Linear, Quadratic, and Regularized Discriminant Analysis, Data Science Blog, Nov. 30, 2018) (Year: 2018).*

(Continued)

*Primary Examiner* — Daniel R Miller
*Assistant Examiner* — Christian T Bryant
(74) *Attorney, Agent, or Firm* — Schwegman Lundberg & Woessner, P.A.

(57) ABSTRACT

Embodiments for a terrain following (TF) radar configured for use in an airborne system are generally described herein. In some embodiments, a radar return comprising dual polarimetry radar data is processed to determine a Correlation Coefficient (CC), a Differential Reflectivity (ZDR), and a Specific Differential Phase (KDP). Discriminator logic is applied to the CC, the ZDR and the KDP to determine whether the radar return comprises solely rain. Further signal processing may be performed on the radar return when the radar return does not comprise solely rain. When the radar signal comprises solely rain, the radar return is tagged as a rain return. Applying the discriminator logic may include applying linear and/or quadratic functions to the CC, the ZDR and the KDP to determine whether the radar return comprises solely rain.

20 Claims, 2 Drawing Sheets

(51) Int. Cl.
  *G01S 13/935* (2020.01)
  *G01S 13/95* (2006.01)
  *G05D 1/10* (2006.01)
  *G01S 7/02* (2006.01)
  *G01S 7/41* (2006.01)

(52) U.S. Cl.
  CPC .............. *G01S 7/025* (2013.01); *G01S 7/411* (2013.01); *G01S 13/935* (2020.01); *G01W 1/02* (2013.01)

(56) References Cited

U.S. PATENT DOCUMENTS

| | | | |
|---|---|---|---|
| 2011/0063161 A1 | 3/2011 | Ishizawa et al. | |
| 2012/0256785 A1* | 10/2012 | Balaji | G01S 13/951 342/174 |

OTHER PUBLICATIONS

Wikipedia (Terrain-following radar, Wikipedia, Jul. 24, 2020) (Year: 2020).*

"Products in RadarScope—Dual-Polarization", [Online], Retrieved from the Internet: <URL: https://www.radarscope.app/guide/radarscope-products-dual-polarization>, (Accessed Aug. 24, 2020), 5 pgs.

"Research Tools—Dual Polarized Radar", National Severe Storms Laboratory, [Online]. Retrieved from the Internet: <URL: https://www.nssl.noaa.gov/tools/radar/dualpol/>, (Accessed Aug. 24, 2020), 9 pgs.

"What is Dual-Polarization Radar and What Can it Do for Me?", National Weather Service, Louisville, KY, [Online], (Accessed Aug. 24, 2020), 27 pgs.

* cited by examiner

SYSTEM AND METHOD FOR WEATHER CLUTTER REJECTION USING POLARIMETRY DATA FOR TERRAIN FOLLOWING RADAR

TECHNICAL FIELD

Embodiments pertain to dual polarization radar. Some embodiments pertain to terrain-following radars.

BACKGROUND

Weather radars are configured to detect the intensity of echoes reflected by precipitation particles of clouds, rain, and the like, to allow observation and forecasting of weather. Weather detections are a problem for terrain following radars, because the radar sensor detects the clouds/rain and commands the pilot to climb over the weather.

Thus, there are general needs for improved terrain following radars.

SUMMARY

Embodiments of a system for a terrain following (TF) radar configured for use in an airborne system are generally described herein. In some embodiments, a radar return comprising dual polarimetry radar data is processed to determine a Correlation Coefficient (CC), a Differential Reflectivity (ZDR), and a Specific Differential Phase (KDP). Discriminator logic is applied to the CC, the ZDR and the KDP to determine whether the radar return comprises solely rain. Further signal processing may be performed on the radar return when the radar return does not comprise solely rain. When the radar signal comprises solely rain, the radar return is tagged as a rain return. Applying the discriminator logic may include applying linear and/or quadratic functions to the CC, the ZDR and the KDP to determine whether the radar return comprises solely rain.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As mentioned above, weather detection is a problem for terrain following radars because the radar sensors detect the clouds and rain in addition to terrain and may command the pilot to climb over the weather. Terrain following radar providers have attempted to solve this problem using various methods such as Sensitivity Time Control, Range Dependent Detection Thresholding, Doppler Processing, and Noncontiguous Terrain Algorithms. Embodiments disclosed herein allow a radar to discriminate between weather and terrain in order to reject the weather radar returns and allow the aircraft to safely fly through the clouds/rain while continuing to avoid terrain/towers.

Embodiments described herein use dual-polarization radar data to help reject weather. Dual polarization radars emit pulses of horizontally polarized waves and vertically polarized waves alternately and observe the shape, size, and the like based on complex differences in reflection (i.e., phase as well as intensity). These embodiments are described in more detail below.

Prior approaches have been predominately concerned with the meteorological classification of radar returns (e.g., hydrometeor classification) for weather prediction and observation purposes. Embodiments disclosed herein discriminate rain from all other returns with the intention of maintaining the terrain/tower returns. In some embodiments, additionally, hail, snow, and other non-liquid meteorological returns would be retained.

Figure 1:
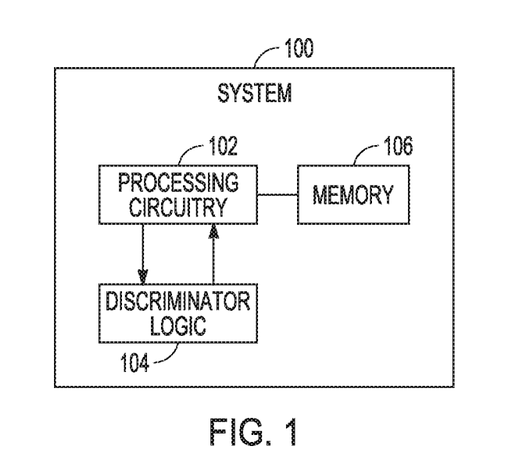
FIG. 1 is a system for a terrain following (TF) radar in accordance with some embodiments.

FIG. 1 is a system for a terrain following (TF) radar in accordance with some embodiments. The system 100 may be configured for use in an airborne system. The system 100 comprises processing circuitry 102, discriminator logic 104 and memory 106. In accordance with embodiments, when configured for weather rejection, the processing circuitry is configured to process a radar return comprising dual polarimetry radar data to determine a Correlation Coefficient (CC), a Differential Reflectivity (ZDR), and a Specific Differential Phase (KDP), and apply discriminator logic to the CC, the ZDR and the KDP to determine whether the radar return comprises solely rain.

In these embodiments, the processing circuitry 102 may be configured to perform further signal processing on the radar return when the radar return does not comprise solely rain. When the radar signal comprises solely rain, the processing circuitry 102 is configured to tag the radar return as a rain return and refrain from further processing the radar return. In some embodiments, the memory 106 is configured to store the radar returns that are tagged as rain returns. In these embodiments, radar returns that are solely rain are able to be rejected while radar returns that include rain returns as well as non-rain returns (buildings, towers, terrain) are not rejected. In some embodiments, the tagged rain returns may be used for subsequent comparisons.

In some embodiments, the dual polarimetry radar data may comprise horizontal and vertical returns resulting from pulses comprising alternately transmitted horizontally and vertically polarized waves. The CC may comprise a measure of similarity of cross-polarized pulses or orthogonally polarized pulses within a pulse volume associated with the radar return. The ZDR may comprise a difference in power between the horizontal and vertical returns. The KDP may comprise a differential phase shift between the horizontal and vertical returns resulting from propagation of the pulses through a medium.

In some embodiments, the discriminator logic 104 may comprise a quadratic discriminator configured to apply a quadratic function to the CC, the ZDR and the KDP to determine whether the radar return comprises solely rain. In these embodiments, the memory 106 may be configured to store the quadratic discriminator including various coefficients for use in the quadratic functions. In some embodiments, linear thresholds may be initially applied for the CC, the ZDR and/or the KDP before application of the quadratic discriminator, although the scope of the embodiments is not limited in this respect.

In some embodiments, the discriminator logic 104 may comprise a linear discriminator configured to apply linear functions and/or thresholds to the CC, the ZDR and the KDP to determine whether the radar return comprises solely rain. In some embodiments, the linear functions may be based on one or more thresholds for each of the CC, the ZDR and the KDP. In these embodiments, the memory 106 may be configured to store one or more of the linear functions and one or more of the thresholds.

In some embodiments (see FIG. 2), the processing circuitry 102 is configured to apply the discriminator logic 104 to determine if the CC is above a rain CC upper threshold or below a rain CC lower threshold. If the CC is above the rain CC upper threshold, the processing circuitry 102 is configured to tag the radar return as a rain return (i.e., rejecting the radar return) and refrain from further signal processing of the radar return. If the CC is below the rain CC lower threshold, the radar return is determined to include a non-rain return, and the processing circuitry 102 is configured to retain the radar return and continue signal processing the radar return. If the CC is not above the rain CC upper threshold and if the CC is not below the rain CC lower threshold, further processing may be needed to determine if the radar return comprises solely rain. In these embodiments, the processing circuitry 102 is configured to further process the radar return by applying the discriminator logic 104 using the ZDR and the KDP to determine whether the radar return comprises rain.

In these example embodiments illustrated in FIG. 2, the CC may be used as a primary decision parameter to initially screen radar returns for rain (i.e., when the CC is above the rain CC upper threshold, the return is tagged as a rain return and when the CC is below the rain CC lower threshold, the return is determined to include a non-rain return.), although the scope of the embodiments is not limited in this respect as other parameters may be used for initial screening. The CC may have a value ranging from 0 to 1. In some example embodiments, the rain CC upper threshold may be 0.97 and the rain CC lower threshold may be 0.90, although the scope of the embodiments is not limited in this respect. In some embodiments, the KDP may be used as a primary parameter to initially screen radar returns for terrain.

Figure 2:
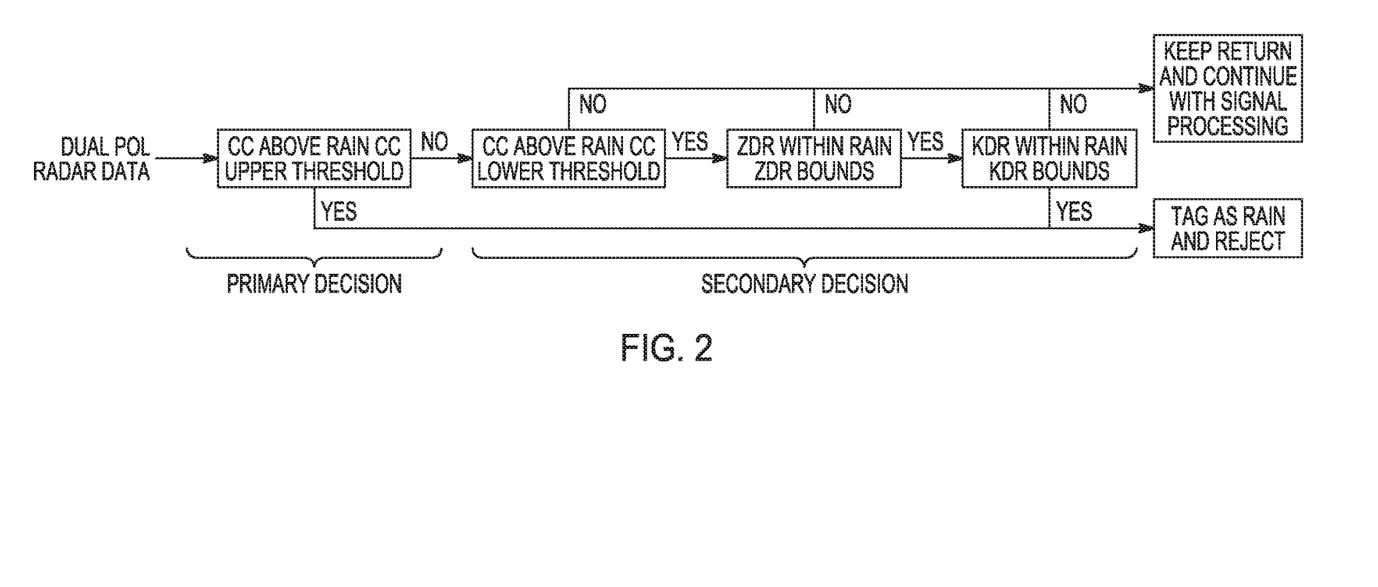
FIG. 2 is an example processing flow diagram in accordance with some embodiments.

In the example embodiments illustrated in FIG. 2, the ZDR may be used as a secondary decision parameter to screen the radar return for rain (i.e. when the CC was between the upper and lower threshold). For this embodiment (see FIG. 2), the processing circuitry 102 is configured to apply the discriminator logic 104 to determine whether the ZDR is not within rain ZDR bounds (i.e. between an upper and lower ZDR threshold). When the ZDR is not within the rain ZDR bounds, the processing circuitry 102 is configured to retain the radar return and continue signal processing the radar return. When the ZDR is within the rain ZDR bounds, the processing circuitry 102 is configured to further process the radar return to determine the KDP. In these embodiments, the ZDR and KDP may be used as a secondary decisions as illustrated in FIG. 2.

In these example embodiments illustrated in FIG. 2, the KDP may be used as a secondary decision parameter to screen the radar return for rain (i.e. when the CC was between the upper and lower threshold). For this embodiment (see FIG. 2), the processing circuitry 102 is configured to apply the discriminator logic 104 to determine whether the KDP is not within rain KDP bounds (i.e. between an upper and lower KDP threshold). When the KDP is not within the rain KDP bounds, the processing circuitry 102 is configured to retain the radar return and continue signal processing the radar return. When the KDP is within the rain KDP bounds, the processing circuitry 102 is configured to tag the radar return as a rain return, reject the radar return and refrain from further signal processing the radar return.

In some embodiments, the discriminator logic 104 may also comprise a quadratic discriminator (in additional to a linear discriminator). In these embodiments, the thresholds may be quadratic thresholds that comprise quadratic functions and the discriminator logic may be configured to apply the quadratic functions to the CC, the ZDR and the KDP. In these embodiments, the thresholds may be viewed as a three-dimensional (3D) quadratic surface in 3D space wherein the three dimension comprise the CC, the ZDR and the KDP.

In some embodiments, the radar returns comprise horizontal and vertical returns for a range and an elevation. In some embodiments, the airborne system may be configured for use on a vertical lift aircraft. In some embodiments, the system is configured to discriminate terrain from rain and generate a command for terrain following or avoidance when terrain is identified and refrain from generating a command for terrain following or avoidance when solely rain is identified.

Some embodiments are directed non-transitory computer-readable storage medium that stores instructions for execution by processing circuitry 102 for a terrain following (TF) radar configured for use in an airborne system. Some embodiments are directed to a terrain-following (TF) radar configured for use in an airborne system.

Some embodiments disclosed herein exploit polarimetric data that is captured by a full/dual polarization radar system which captures polarimetric data to discriminate target types. As discussed above, the dual polarization data may be used to calculate the differential reflectivity, correlation coefficient, and specific differential phase. These parameters contain the information needed to discriminate weather returns from terrain/towers. By discriminating target types, weather returns may be classified and discarded so that the terrain following radar can reject the weather returns while safely avoiding hazardous terrain/towers. Some embodiments employ the use of polarimetric data to discriminate detection types (e.g., weather, terrain, and towers) for a terrain following radar.

The Correlation Coefficient (CC) is a measure of how similar cross-polarized pulses or orthogonally polarized pulses are within a pulse volume. The CC ranges from 0 to 1. This may be used as the primary discriminator for rain returns. Rain CC generally exceeds 0.97. Non-meteorological returns are typically below 0.8.

Differential Reflectivity (ZDR) is the difference in horizontal and vertical power. The ZDR provides information regarding the size and shape of the return. Raindrops have a positive ZDR, due to the fact that the vertical extent flattens as it falls. Spherical returns have a ZDR of 0. Additionally, ZDR is biased towards larger particles, so tower/terrain detections in rain provide a larger contribution to aid in tower detection.

Specific Differential Phase (KDP) is the differential phase shift between the horizontal and vertical returns as the pulse propagates through the medium. Horizontally oriented targets produce a positive KDP, while vertically oriented targets produce a negative KDP. Non-meteorological returns produce highly variable KDP. KDP is best used to detect heavy rain, due to the high KDP associated with the size and concentration or rain drops.

Some embodiments may implement the following:

```
Dual Polarization Rain Rejection Algorithm
for idx = 1:N
    if scatterer.CC(idx) >= thresh.CC_Upper_Min
        %Primary Decision
            decision.type(idx) = 1;
    elseif (scatterer.CC(idx) >= thresh.CC_Lower_Min) ...
        %Secondary Decision
                    && (scatterer.ZDR(idx) >= thresh.ZDR_Min)
    && (scatterer.ZDR(idx) <= thresh.ZDR_Max) ...
                    && (scatterer.KDP(idx) >= thresh.KDP_Min)
    && (scatterer.KDP(idx) <= thresh.KDP_Max)
            decision.type(idx) = 1;
    else
            decision.type(idx) = 0;
    end
end
decision.idxRain = find(decision.type == 1);
decision.idxTerrain = find(decision.type == 0);
```

Figure 3:
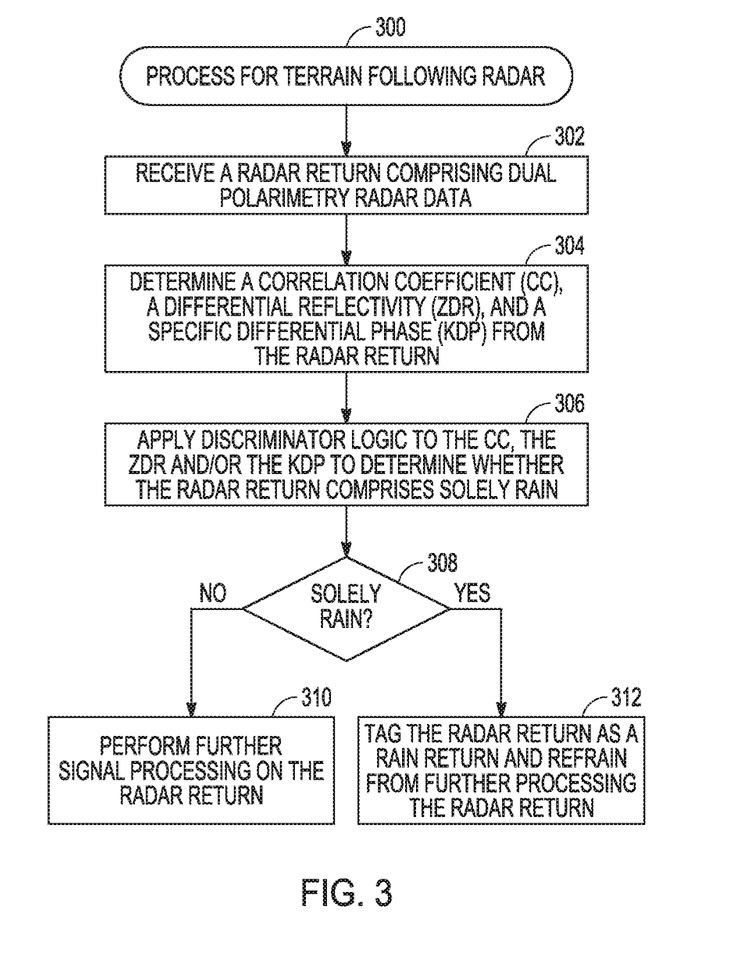
FIG. 3 is a process performed by a TF radar in accordance with some embodiments.

FIG. 3 is a process performed by a TF radar in accordance with some embodiments. Process 300 may be performed by a terrain following (TF) radar configured for use in an airborne system for weather rejection. Process 300 may be performed by processing circuitry as discussed above. Operation 302 may comprise receiving a radar return comprising dual polarimetry radar data. Operation 304 may comprise determining a Correlation Coefficient (CC), a Differential Reflectivity (ZDR), and a Specific Differential Phase (KDP) from the radar return. Operation 306 may comprise applying discriminator logic to the CC, the ZDR and the KDP to determine whether the radar return comprises solely rain.

When the radar return is determined not to comprise solely rain, operation 308, instructs the processing circuitry to perform operation 310. When the radar return is determined to comprise solely rain, operation 308, instructs the processing circuitry to perform operation 312.

In operation 310, further signal processing is performed on the radar return when the radar return does not comprise solely rain. In some embodiments, the further signal processing may comprise identifying non-rain returns, although the scope of the embodiments is not limited in this respect. In operation 312, the radar return is tagged as a rain return and the processing circuitry may refrain from further processing the radar return.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for a terrain following (TF) radar configured for use in an airborne system, the system configured to discriminate terrain from rain, the system comprising: processing circuitry; and memory, wherein for weather rejection, the processing circuitry is configured to:
    process a radar return comprising dual polarimetry radar data to determine a Correlation Coefficient (CC), a Differential Reflectivity (ZDR), and a Specific Differential Phase (KDP);
    apply discriminator logic to the CC, the ZDR and the KDP to determine whether the radar return comprises solely rain or whether the radar return comprises terrain; and
    perform further signal processing on the radar return when the radar return does not comprise solely rain; and
    when the radar signal comprises solely rain, tag the radar return as a rain return and refrain from further processing the radar return,
    generate a command for terrain following or avoidance when the radar return comprises terrain and refrain from generating a command for terrain following or avoidance when the radar return comprises solely rain, and
    wherein the memory is configured to store the radar returns that are tagged as rain returns.

2. The system of claim 1, wherein the dual polarimetry radar data comprise horizontal and vertical returns resulting from pulses comprising alternately transmitted horizontally and vertically polarized waves,
    wherein the CC comprises a measure of similarity of orthogonally polarized pulses within a pulse volume associated with the radar return,
    wherein the ZDR comprises a difference in power between the horizontal and vertical returns, and
    wherein the KDP comprises a differential phase shift between the horizontal and vertical returns resulting from propagation of the pulses through a medium.

3. The system of claim 2 wherein the discriminator logic comprises a quadratic discriminator configured to apply a quadratic function to the CC, the ZDR and the KDP to determine whether the radar return comprises solely rain.

4. The system of claim 2 wherein the discriminator logic comprises a linear discriminator configured to apply linear functions to the CC, the ZDR and the KDP to determine whether the radar return comprises solely rain, and
    wherein the linear functions are based on one or more thresholds for each of the CC, the ZDR and the KDP.

5. The system of claim 2, wherein the radar return comprises the horizontal and vertical returns for a range and an elevation.

6. The system of claim 5 wherein the airborne system is configured for use on a vertical lift aircraft.

7. A system for a terrain following (TF) radar configured for use in an airborne system the system configured to discriminate terrain from rain, the system comprising: processing circuitry; and memory, wherein for weather rejection, the processing circuitry is configured to:
    process a radar return comprising dual polarimetry radar data to determine a Correlation Coefficient (CC), a Differential Reflectivity (ZDR), and a Specific Differential Phase (KDP);

apply discriminator logic to the CC, the ZDR and the KDP to determine whether the radar return comprises solely rain or whether the radar return comprises terrain; and perform further signal processing on the radar return when the radar return does not comprise solely rain; and when the radar signal comprises solely rain, tag the radar return as a rain return and refrain from further processing the radar return, generate a command for terrain following or avoidance when the radar return comprises terrain and refrain from generating a command for terrain following or avoidance when the radar return comprises solely rain, and wherein the memory is configured to store the radar returns that are tagged as rain returns, wherein the dual polarimetry radar data comprise horizontal and vertical returns resulting from pulses comprising alternately transmitted horizontally and vertically polarized waves, wherein the CC comprises a measure of similarity of orthogonally polarized pulses within a pulse volume associated with the radar return, wherein the ZDR comprises a difference in power between the horizontal and vertical returns, and wherein the KDP comprises a differential phase shift between the horizontal and vertical returns resulting from propagation of the pulses through a medium, wherein the discriminator logic comprises a linear discriminator configured to apply linear functions to the CC, the ZDR and the KDP to determine whether the radar return comprises solely rain, and wherein the linear functions are based on one or more thresholds for each of the CC, the ZDR and the KDP wherein the processing circuitry is configured to apply the discriminator logic to determine if the CC is above a rain CC upper threshold or below a rain CC lower threshold, and if the CC is above the rain CC upper threshold, the processing circuitry is configured to tag the radar return as a rain return and refrain from further signal processing of the radar return, if the CC is below the rain CC lower threshold, the radar return is determined to include a non-rain return, and the processing circuitry is configured to retain the radar return, and wherein:

if the CC is not above the rain CC upper threshold and if the CC is not below the rain CC lower threshold, the processing circuitry is configured to further process the radar return by applying the discriminator logic using the ZDR and the KDP to determine whether the radar return comprises rain.

8. The system of claim 7, wherein the processing circuitry is configured to apply the discriminator logic to determine whether the ZDR is not within rain ZDR bounds, wherein if the ZDR is not within the rain ZDR bounds, the processing circuitry is configured to retain the radar return and continue signal processing the radar return, wherein if the ZDR is within the rain ZDR bounds, the processing circuitry is configured to further process the radar return to determine the KDP.

9. The system of claim 8, wherein the processing circuitry is configured to apply the discriminator logic to determine whether the KDP is not within a rain KDP bounds, wherein if the KDP is not within the rain KDP bounds, the processing circuitry is configured to retain the radar return and continue signal processing the radar return, and wherein if the KDP is within the rain KDP bounds, the processing circuitry is configured to tag the radar return as a rain return, reject the radar return, and refrain from further signal processing the radar return.

10. The system of claim 9, wherein the discriminator logic further comprises a quadratic discriminator, and wherein the thresholds comprise quadratic functions, and wherein the discriminator logic is configured to apply the quadratic functions to the CC, the ZDR and the KDP.

11. A system for a terrain following (TF) radar configured for use in an airborne system, the system configured to discriminate terrain from rain, the system comprising: processing circuitry; and memory, wherein for weather rejection, the processing circuitry is configured to:

process a radar return comprising dual polarimetry radar data to determine a Correlation Coefficient (CC), a Differential Reflectivity (ZDR), and a Specific Differential Phase (KDP);

apply discriminator logic to the CC, the ZDR and the KDP to determine whether the radar return comprises solely rain or whether the radar return comprises terrain; and perform further signal processing on the radar return when the radar return does not comprise solely rain; and when the radar signal comprises solely rain, tag the radar return as a rain return and refrain from further processing the radar return, generate a command for terrain following or avoidance when the radar return comprises terrain and refrain from generating a command for terrain following or avoidance when the radar return comprises solely rain, and wherein the memory is configured to store the radar returns that are tagged as rain returns, wherein the dual polarimetry radar data comprise horizontal and vertical returns resulting from pulses comprising alternately transmitted horizontally and vertically polarized waves, wherein the CC comprises a measure of similarity of orthogonally polarized pulses within a pulse volume associated with the radar return, wherein the ZDR comprises a difference in power between the horizontal and vertical returns, and wherein the KDP comprises a differential phase shift between the horizontal and vertical returns resulting from propagation of the pulses through a medium, wherein the radar return comprises the horizontal and vertical returns for a range and an elevation, and wherein the system is configured to discriminate terrain from rain and generate a command for terrain following or avoidance when terrain is identified and refrain from generating a command for terrain following or avoidance when solely rain is identified.

12. A non-transitory computer-readable storage medium that stores instructions for execution by processing circuitry for a terrain following (TF) radar configured for use in an airborne system, wherein for weather rejection, the processing circuitry is configured to:

process a radar return comprising dual polarimetry radar data to determine a Correlation Coefficient (CC), a Differential Reflectivity (ZDR), and a Specific Differential Phase (KDP);

apply discriminator logic to the CC, the ZDR and the KDP to determine whether the radar return comprises solely rain or whether the radar return comprises terrain; and perform further signal processing on the radar return when the radar return does not comprise solely rain;

when the radar signal comprises solely rain, tag the radar return as a rain return and refrain from further processing the radar return; and generate a command for terrain following or avoidance when the radar return comprises terrain and refrain from generating a command for terrain following or avoidance when the radar return comprises solely rain.

13. The non-transitory computer-readable storage medium of claim 12, wherein the dual polarimetry radar data comprise horizontal and vertical returns resulting from pulses comprising alternately transmitted horizontally and vertically polarized waves, wherein the CC comprises a measure of similarity of orthogonally polarized pulses within a pulse volume associated with the radar return, wherein the ZDR comprises a difference in power between the horizontal and vertical returns, and wherein the KDP comprises a differential phase shift between the horizontal and vertical returns resulting from propagation of the pulses through a medium.

14. The non-transitory computer-readable storage medium of claim 13 wherein the discriminator logic comprises a quadratic discriminator configured to apply a quadratic function to the CC, the ZDR and the KDP to determine whether the radar return comprises solely rain.

15. The non-transitory computer-readable storage medium of claim wherein the discriminator logic comprises a linear discriminator configured to apply linear functions to the CC, the ZDR and the KDP to determine whether the radar return comprises solely min, the linear functions based on one or more thresholds for each of the CC, the ZDR and the KDP.

16. A non-transitory computer-readable storage medium that stores instructions for execution by processing circuitry for a terrain following (TF) radar configured for use in an airborne system, wherein for weather rejection, the processing circuitry is configured to:

process a radar return comprising dual polarimetry radar data to determine a Correlation Coefficient (CC), a Differential Reflectivity (ZDR), and a Specific Differential Phase (KDP);

apply discriminator logic to the CC, the ZDR and the KDP to determine whether the radar return comprises solely rain or whether the radar return comprises terrain; and perform further signal processing on the radar return when the radar return does not comprise solely rain;

when the radar signal comprises solely rain, tag the radar return as a rain return and refrain from further processing the radar return; and generate a command for terrain following or avoidance when the radar return comprises terrain and refrain from generating a command for terrain following or avoidance when the radar return comprises solely rain, wherein the dual polarimetry radar data comprise horizontal and vertical returns resulting from pulses comprising alternately transmitted horizontally and vertically polarized waves, wherein the CC comprises a measure of similarity of orthogonally polarized pulses within a pulse volume associated with the radar return, wherein the ZDR comprises a difference in power between the horizontal and vertical returns, and wherein the KDP comprises a differential phase shift between the horizontal and vertical returns resulting from propagation of the pulses through a medium, wherein the discriminator logic comprises a linear discriminator configured to apply linear functions to the CC, the ZDR and the KDP to determine whether the radar return comprises solely rain, the linear functions based on one or more thresholds for each of the CC, the ZDR and the KDP, wherein the processing circuitry is configured to apply the discriminator logic to determine if the CC is above a rain CC upper threshold or below a rain CC lower threshold, and if the CC is above the rain CC upper threshold, the processing circuitry is configured to tag the radar return as a rain return and refrain from further signal processing of the radar return, if the CC is below the rain CC lower threshold, the radar return is determined to include a non-rain return, and the processing circuitry is configured to retain the radar return, and wherein:

if the CC is not above the rain CC upper threshold and if the CC is not below the rain CC lower threshold, the processing circuitry is configured to further process the radar return by applying the discriminator logic using the and the KDP to determine whether the radar return comprises rain.

17. The non-transitory computer-readable storage medium of claim 16, wherein the processing circuitry is configured to apply the discriminator logic to determine whether the ZDR is not within rain ZDR bounds, wherein if the ZDR is not within the rain ZDR bounds, the processing circuitry is configured to retain the radar return and continue signal processing; the radar return, wherein if the ZDR is within the rain ZDR bounds, the processing circuitry is configured to further process the radar return to determine the KDP, wherein the processing circuitry is configured to apply the discriminator logic to determine whether the KDP is not within a rain KDP bounds, wherein if the KDP is not within the rain KDP bounds, the processing circuitry is configured to retain the radar return and continue signal processing the radar return, and wherein if the KDP is within the rain KDP bounds, the processing circuitry is configured to tag the radar return as a rain return, reject the radar return, and refrain from further signal processing the radar return.

18. The non-transitory computer-readable: storage medium of claim 17, wherein the discriminator logic further comprises a quadratic discriminator, and wherein the thresholds comprise quadratic functions, and wherein the discriminator logic is configured to apply the quadratic functions to the CC, the ZDR and the KDP.

19. A method to be performed by processing circuitry of a terrain following (TF) radar configured for use in an airborne system, the method comprising:

processing a radar return comprising dual polarimetry radar data to determine a Correlation Coefficient (CC), a Differential Reflectivity (ZDR), and a Specific Differential Phase (KDP);

applying discriminator logic to the CC, the ZDR and the KDP to determine whether the radar return comprises solely rain; and performing further signal processing on the radar return when the radar return does not comprise solely rain;

when the radar signal comprises solely rain, tagging the radar return as a rain return and refrain from further processing the radar return; and generating a command for terrain following or avoidance when the radar return comprises terrain and refrain from generating a command for terrain following or avoidance when the radar return comprises solely rain.

20. The method of claim 19, wherein applying discriminator logic comprises applying linear and/or quadratic functions to the CC, the ZDR and the KDP to determine whether the radar return comprises solely rain.

* * * * *

UNITED STATES PATENT AND TRADEMARK OFFICE
CERTIFICATE OF CORRECTION

| | |
|---|---|
| PATENT NO. | : 11,714,191 B2 |
| APPLICATION NO. | : 16/984761 |
| DATED | : August 1, 2023 |
| INVENTOR(S) | : Stephen R. Porter |

It is certified that error appears in the above-identified patent and that said Letters Patent is hereby corrected as shown below:

In the Claims

In Column 6, Line 60, in Claim 7, delete "system" and insert --system,-- therefor In Column 9, Line 33, in Claim 15, delete "claim" and insert --claim 13,-- therefor

In Column 9, Line 36, in Claim 15, delete "min," and insert --rain,-- therefor In Column 10, Line 29, in Claim 16, after "the", insert --ZDR--

In Column 10, Line 37, in Claim 17, delete "processing;" and insert --processing-- therefor In Column 10, Line 52, in Claim 18, delete "computer-readable:" and insert --computer-readable-- therefor Signed and Sealed this
Twenty-sixth Day of November, 2024

Katherine Kelly Vidal
*Director of the United States Patent and Trademark Office*